US012251925B2

(12) United States Patent
Losiewicz

(10) Patent No.: US 12,251,925 B2
(45) Date of Patent: Mar. 18, 2025

(54) METHOD FOR REPLACING ITEMS IN A STENCIL PRINTER USING A DUAL FUNCTION TOOLING TRAY

(71) Applicant: Illinois Tool Works Inc., Glenview, IL (US)

(72) Inventor: William A. Losiewicz, Douglas, MA (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 18/383,578

(22) Filed: Oct. 25, 2023

(65) Prior Publication Data

US 2024/0066857 A1 Feb. 29, 2024

Related U.S. Application Data

(62) Division of application No. 17/889,924, filed on Aug. 17, 2022, now Pat. No. 11,845,260.

(51) Int. Cl.
*B41F 15/12* (2006.01)
*B41F 15/14* (2006.01)
*B41M 1/12* (2006.01)

(52) U.S. Cl.
CPC .............. *B41F 15/12* (2013.01); *B41F 15/14* (2013.01)

(58) Field of Classification Search
CPC ....... B41F 15/08; B41F 15/12; H05K 3/1216; H05K 3/1224; H05K 3/1233
See application file for complete search history.

(56) References Cited

U.S. PATENT DOCUMENTS

| | | | | |
|---|---|---|---|---|
| 2002/0158396 | A1 | 10/2002 | Bennett et al. | |
| 2020/0391530 | A1 | 12/2020 | Losiewicz et al. | |
| 2020/0391531 | A1* | 12/2020 | Losiewicz | B41F 15/34 |
| 2021/0197545 | A1 | 7/2021 | Yokoi | |

FOREIGN PATENT DOCUMENTS

| | | | | |
|---|---|---|---|---|
| JP | 2019034415 | A | 3/2019 | |
| WO | WO-2018105016 | A1 * | 6/2018 | B41F 15/0881 |

OTHER PUBLICATIONS

English translation of WO 2018/105016 A1 to Hirukawa et al., publication date Jun. 14, 2018. (Year: 2018).*
International Search Report and Written Opinion from International Application No. PCT/US2023/025537 dated Oct. 19, 2023.

* cited by examiner

*Primary Examiner* — Leslie J Evanisko
(74) *Attorney, Agent, or Firm* — Lando & Anastasi, LLP

(57) ABSTRACT

A dual function tooling tray for a stencil printer includes a perimeter frame, a first frame member spaced from a first side of the perimeter frame, a second frame member spaced from a second side of the perimeter frame, and a third frame member extending between and secured to the first frame member and the second frame member. The third frame member is configured to support at least one squeegee blade assembly. The tooling tray further includes a first support secured to the first frame member and a second support secured to the second frame member. The first support and the second support are configured to support a tooling plate. The tooling tray further includes a third support secured to the first frame member and a fourth support secured to the second frame member. The third support and the fourth support are configured to support a tooling plate.

19 Claims, 15 Drawing Sheets

METHOD FOR REPLACING ITEMS IN A STENCIL PRINTER USING A DUAL FUNCTION TOOLING TRAY

BACKGROUND OF THE DISCLOSURE

1. Field of Invention

This application relates generally to stencil printers and related methods to print viscous materials, e.g., solder paste, on an electronic substrate, e.g., a printed circuit board (PCB), and more particularly to systems and methods for replacing items in a stencil printer including a dual function tooling tray.

2. Discussion of Related Art

In manufacturing a surface-mount printed circuit board, a stencil printer can be used to print solder paste onto the circuit board. Typically, a circuit board having a pattern of pads or some other conductive surface onto which solder paste will be deposited is automatically fed into the stencil printer; and one or more small holes or marks (known as "fiducials") on the circuit board are used to properly align the circuit board with the stencil or screen of the stencil printer prior to printing solder paste onto the circuit board. In some systems, an optical alignment system embodying an imaging or vision system is used to align the circuit board with the stencil.

Once the circuit board has been properly aligned with the stencil in the printer, the circuit board is raised to the stencil, solder paste is dispensed onto the stencil, and a wiper blade (or squeegee) traverses the stencil to force the solder paste through apertures in the stencil and onto the circuit board. As the squeegee is moved across the stencil, the solder paste tends to roll in front of the blade, which desirably causes mixing and shearing of the solder paste so as to attain a desired viscosity to facilitate filling of the apertures in the screen or stencil. The solder paste typically is dispensed onto the stencil from a standard cartridge. The stencil is then separated from the circuit board and the adhesion between the circuit board and the solder paste causes most of the material to stay on the circuit board. Material left on the surface of the stencil is removed in a cleaning process before additional circuit boards are printed.

Another process in the printing of circuit boards involves inspection of the circuit boards after solder paste has been deposited on the surface of the circuit boards. Inspecting the circuit boards is important for determining that clean electrical connections can be made. An excess of solder paste can lead to shorts, while too little solder paste in appropriate positions can prevent electrical contact. Generally, the imaging inspection system is further employed to provide a two-dimensional or a three-dimensional inspection of the solder paste on the circuit board.

Present day stencil printers require manual intervention to perform routine operations. For example, during a changeover, an operator must perform many manual tasks, such as changing a stencil, replacing a solder paste cartridge, replacing squeegee blades, and replacing support tooling. Each of these tasks require the operator to manually perform the task. For example, with most stencil printers, the operator must unlock the stencil, remove the stencil, properly insert a replacement stencil, and lock the replacement stencil in place. A changeover operation can take as long as 30 minutes, during which the stencil printer is not operating, which may result in the PCB fabrication line not operating.

SUMMARY OF THE DISCLOSURE

One aspect of the present disclosure is directed to a dual function tooling tray for a stencil printer. In one embodiment, the tooling tray comprises a perimeter frame having four sides, a first frame member spaced from a first side of the perimeter frame, a second frame member spaced from a second side of the perimeter frame, the first side and the second side of the perimeter frame being parallel with one another, and a third frame member extending between and secured to the first frame member and the second frame member. The third frame member is configured to support at least one squeegee blade assembly. The tooling tray further comprises a first support secured to the first frame member and a second support secured to the second frame member. The first support and the second support together are configured to support a tooling plate. The tooling tray further comprising a third support secured to the first frame member and a fourth support secured to the second frame member. The third support and the fourth support together are configured to support a tooling plate.

Embodiments of the tooling tray further may include positioning the first support and the second support adjacent a third side of the perimeter frame and positioning the third support and the fourth support adjacent a fourth side of the perimeter frame. The first support and the second support may be spaced apart from one another a predetermined distance sufficient to support the tooling plate. The third support and the fourth support may be spaced apart from one another a predetermined distance sufficient to support the tooling plate. The tooling tray further may include a first support member connected at one end thereof to the first side of the perimeter frame and at an opposite end to the first frame member. The tooling tray further may include a second support member connected at one end thereof to the second side of the perimeter frame and at an opposite end to the second frame member. The first support, the second support, the third support, and the fourth support each include a feature configured to engage a mating feature associated with the tooling plate to support the tooling plate. The feature may be a pin and the mating feature may be an opening sized to receive the pin. At least one of the first support and the second support and at least one of the third support and the fourth support each may include a fiducial configured to be detected by an imaging system. The third frame member may be perpendicular to the first frame member and the second frame member. The third frame member may include at least one squeegee blade assembly support structure. The third frame member further may include a drip tray. The drip tray may be secured to a bottom surface of the third frame member. The perimeter frame may be configured to be engaged by a gripper associated with a print head of a stencil printer.

Another aspect of the present disclosure is directed to a method for replacing items in a stencil printer. In one embodiment, the method comprises: providing a tooling tray including a new tooling support and a new squeegee blade assembly support and a used tooling support and a used squeegee blade assembly support, the tooling tray including a new tooling plate on the new tooling support and a new squeegee blade assembly on the new squeegee blade assembly support; removing used squeegee blades from a print head of the stencil printer; positioning the used squeegee blade assembly on the used squeegee blade assembly support of the tooling tray; removing a used tooling plate from a support assembly of the stencil printer; positioning the used tooling plate on the used tooling support of the tooling tray; removing the new squeegee blade assembly from the tooling tray; installing the new squeegee blade assembly on the print head of the stencil printer; removing the new tooling plate from the tooling tray; and installing the new tooling plate on the support assembly of the stencil printer.

Embodiments of the method further may include presenting the tooling tray to the stencil printer and moving the tooling tray within the stencil printer. Moving the tooling tray may be achieved by a gripper mechanism associated with the print head of the stencil printer. Presenting the tooling tray to the stencil printer may include moving the tooling tray a movable cart is employed to present and remove stencils and tooling trays from the stencil printer. The method further may include verifying a position of the tooling tray. Verifying the position of the tooling tray may include capturing an image of the tooling tray with a fiducial provided on the tooling tray.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
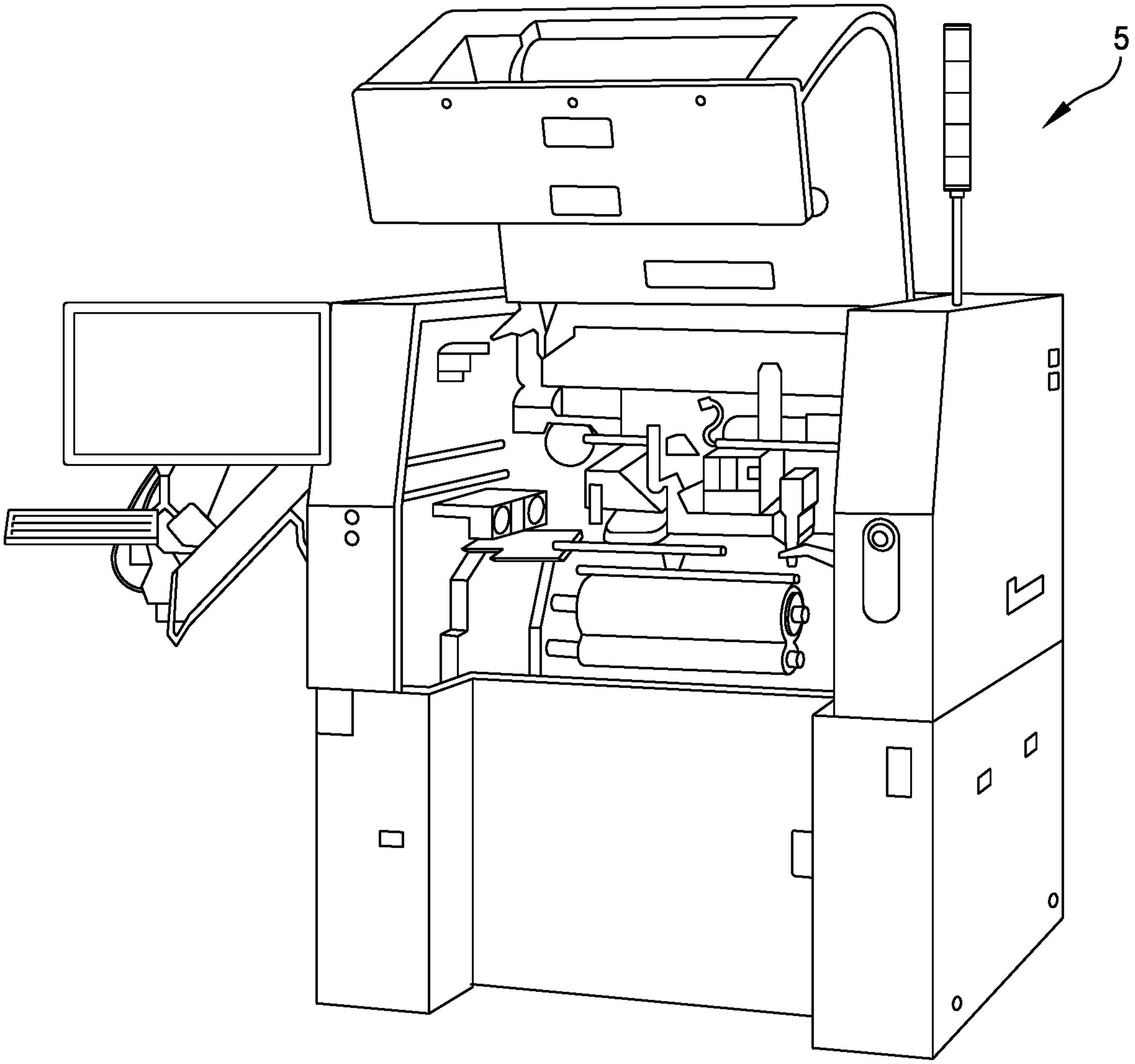
FIG. 1 is a front perspective view of a stencil printer.

The present disclosure relates generally to material application machines (referred to herein as "stencil printers," "screen printers," "printing machines," or "printers") and other equipment utilized in a surface mount technology (SMT) process lines and configured to apply an assembly material (e.g., solder paste, conductive ink, or encapsulation material) onto a substrate (e.g., a printed circuit board, referred to herein as an "electronic substrate," a "circuit board," a "board," a "PCB," a "PCB substrate," a "substrate," or a "PCB board") or to perform other operations, such as inspection, rework, or placement of electronic components onto a substrate. Specifically, embodiments of the present disclosure are described below with reference to stencil printers used to produce printed circuit boards.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

For purposes of illustration, embodiments of the present disclosure will now be described with reference to a stencil printer used to print an assembly material, such as solder paste, onto a circuit board. One skilled in the art will appreciate, however, that embodiments of the present disclosure are not limited to stencil printers that print solder paste onto circuit boards, but rather, may be used in other applications requiring dispensing of other viscous assembly materials, such as glues and encapsulents. For example, the apparatus may be used to print epoxy for use as underfill for chip-scale packages. Further, stencil printers in accordance with embodiments of the present disclosure are not limited to those that print assembly materials on circuit boards, but rather, include those used for printing other materials on a variety of substrates, such as semiconductor wafers. Also, the terms screen and stencil may be used interchangeably herein to describe a device in a printer that defines a pattern to be printed onto a substrate. In certain embodiments, the stencil printer may include a Momentum® or an Edison™ series stencil printer platform offered by ITW Electronic Assembly Equipment of Hopkinton, Massachusetts. An exemplary stencil printer is generally designated at 5 in FIG. 1. In this embodiment, the stencil printer 5 is a Momentum® series stencil printer platform offered by ITW Electronic Assembly Equipment of Hopkinton, Massachusetts.

Figure 2:
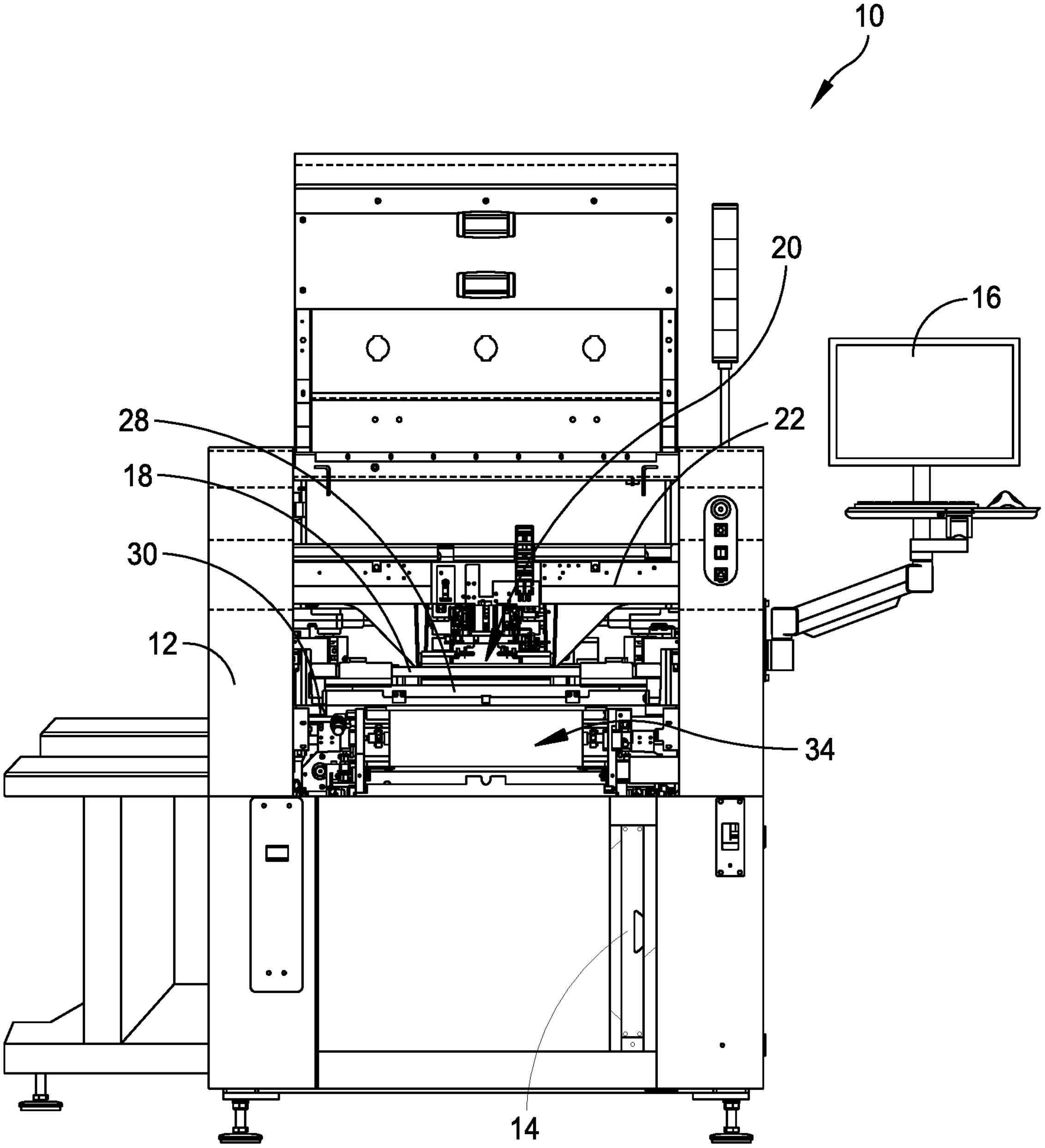
FIG. 2 is a front view of a stencil printer.

Referring to FIG. 2, there is generally indicated at 10 a stencil printer of an embodiment of the disclosure. As shown, the stencil printer 10 includes a frame 12 that supports components of the stencil printer. The components of the stencil printer may include, in part, a controller 14, a display 16, a stencil 18, and a print head or print head assembly, generally indicated at 20, which is configured to apply the solder paste in a manner described in greater detail below.

As shown in FIG. 2 and described below, the stencil and the print head assembly may be suitably coupled or otherwise connected to the frame 12. In one embodiment, the print head assembly 20 may be mounted on a print head assembly gantry 22, which may be mounted on the frame 12. The print head assembly gantry 22 enables the print head assembly 20 to be moved in the y-axis direction under the control of the controller 14 and to apply pressure on the print head assembly as it engages the stencil 18. In a certain embodiment, the print head assembly 20 may be placed over the stencil 18 and may be lowered in the z-axis direction into contact with the stencil to make a seal with the stencil.

The stencil printer 10 may also include a conveyor system having rails (not shown) for transporting a printed circuit board (sometimes referred to as a "printed wiring board," "substrate," or "electronic substrate" herein) to a print position in the stencil printer. The rails sometimes may be referred to herein as a "tractor feed mechanism," which is configured to feed, load or otherwise deliver circuit boards to the working area of the stencil printer, which may be referred to herein as a "print nest," and to unload circuit boards from the print nest.

Figure 3:
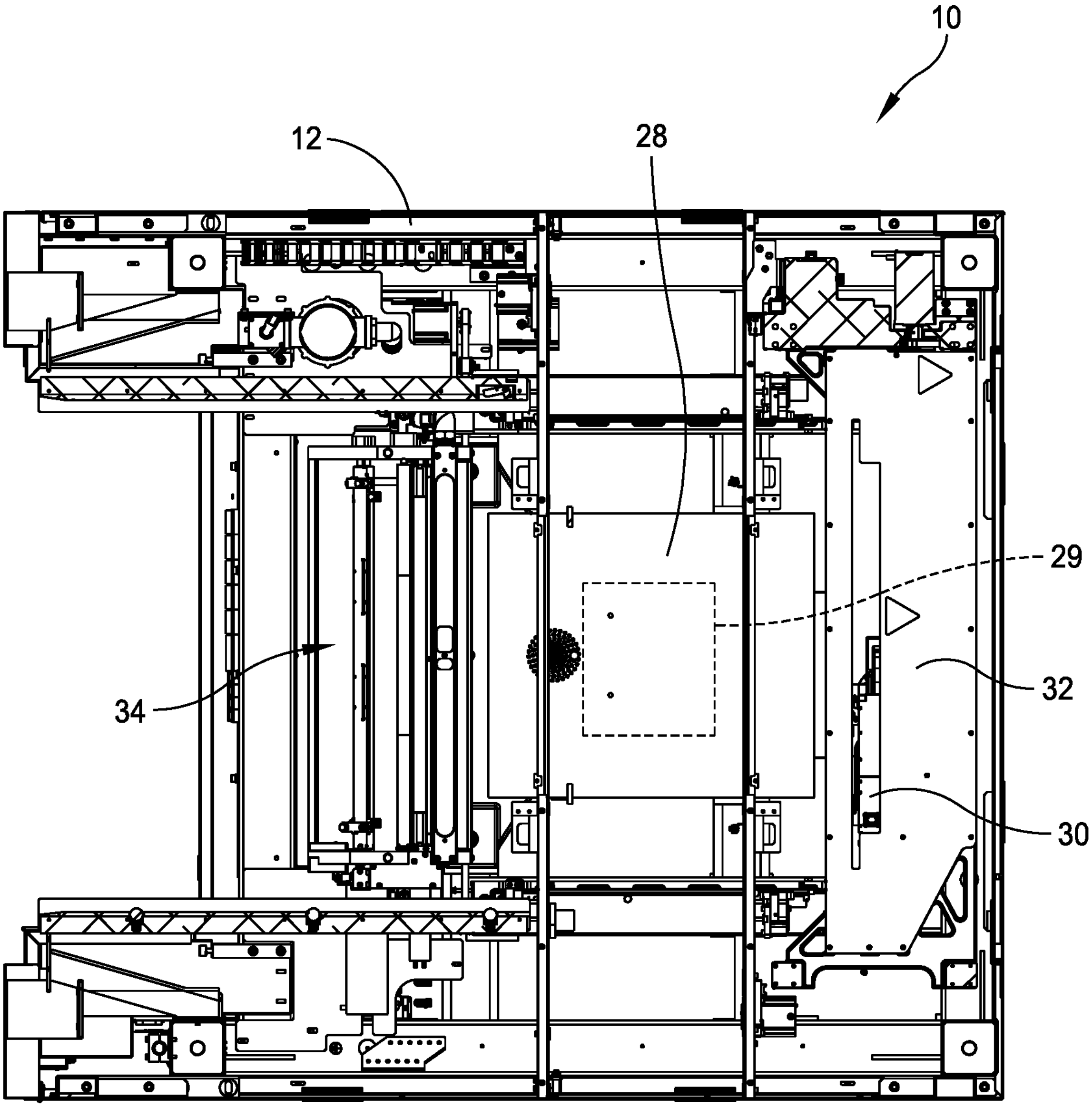
FIG. 3 is a top plan view of the stencil printer illustrated in FIG. 2 with portions removed.

Referring additionally to FIG. 3, the stencil printer 10 has a support assembly 28 to support the circuit board 29 (shown in dashed lines), which raises and secures the circuit board so that it is stable during a print operation. In certain embodiments, the substrate support assembly 28 further may include a particular substrate support system, e.g., a solid support, a plurality of pins or flexible tooling, which is positioned beneath the circuit board when the circuit board is in the print position. The substrate support system may be used, in part, to support the interior regions of the circuit board to prevent flexing or warping of the circuit board during the print operation.

In one embodiment, the print head assembly 20 may be configured to receive solder paste from a source, such as a dispenser, e.g., a solder paste cartridge, that provides solder paste to the print head assembly during the print operation. Other methods of supplying solder paste may be employed in place of the cartridge. For example, solder paste may be manually deposited between the blades or from an external source. Additionally, in a certain embodiment, the controller 14 may be configured to use a personal computer having a suitable operating system, such as a Microsoft Windows® operating system provided by Microsoft Corporation, with application specific software to control the operation of the stencil printer 10. The controller 14 may be networked with a master controller that is used to control a production line for fabricating circuit boards.

In one configuration, the stencil printer 10 operates as follows. A circuit board 29 is loaded into the stencil printer 10 using the conveyor rails. The support assembly 28 raises and secures the circuit board 29 to a print position. The print head assembly 20 is then lowered in the z-axis direction until blades of the print head assembly contact the stencil 18 at a desired pressure. The print head assembly 20 is then moved in the y-axis direction across the stencil 18 by the print head assembly gantry 22. The print head assembly 20 deposits solder paste through apertures in the stencil 18 and onto the circuit board 29. Once the print head assembly has fully traversed the stencil 18 across the apertures, the print head assembly is lifted off the stencil and the circuit board 29 is lowered back onto the conveyor rails. The circuit board 29 is released and transported from the stencil printer 10 so that a second circuit board may be loaded into the stencil printer. To print on the second circuit board 29, the print head assembly is lowered in the z-axis direction into contact with the stencil and moved across the stencil 18 in the direction opposite to that used for the first circuit board.

An imaging system 30 may be provided for the purposes of aligning the stencil 18 with the circuit board 29 prior to printing and to inspect the circuit board after printing. In one embodiment, the imaging system 30 may be disposed between the stencil 18 and the support assembly 28 upon which a circuit board is supported. The imaging system 30 is coupled to an imaging gantry 32 to move the imaging system. In one embodiment, the imaging gantry 32 may be coupled to the frame 12, and includes a beam that extends between side rails of the frame 12 to provide back and forth movement of the imaging system 30 over the circuit board 29 in a y-axis direction. The imaging gantry 32 further may include a carriage device, which houses the imaging system 30, and is configured to move along the length of the beam in an x-axis direction. The construction of the imaging gantry 32 used to move the imaging system 30 is well known in the art of solder paste printing. The arrangement is such that the imaging system 30 may be located at any position below the stencil 18 and above the circuit board 29 to capture an image of predefined areas of the circuit board or the stencil, respectively.

After one or more applications of the solder paste to circuit boards, excess solder paste may accumulate at the bottom of the stencil 18 and a stencil wiper assembly, generally indicated at 34, and may move beneath the stencil to remove the excess solder paste. In other embodiments, the stencil 18 may be moved over the stencil wiper assembly.

As mentioned above, stencil printers have traditionally required manual intervention to perform replacement of certain parts and/or replenishment operations. For example, a typical stencil requires replacement after a certain period of time, e.g., four hours. Also, stencils need replacement for separate production runs. In addition, solder paste cartridges, which supply temperature-controlled solder paste to the stencil printer, require replacement over time, e.g., within four hours or less. A separate production run may require a different type of solder paste material. Another item requiring periodic replacement is squeegee blades, which are subject to wearing during use. And finally, tooling used to support a substrate in a print position is subject to replacement when changing from one production product to another.

In one embodiment, a method of replacing a stencil and/or items placed on tooling trays may include, when a request for a new stencil and/or item on a tooling tray is made, either for a new production run or because of wear on an existing stencil and/or item, a clean stencil and/or item is provided on a movable cart. At the production line, the "dirty" or used stencil and/or item is removed from the stencil printer and the "clean" or new stencil and/or item is inserted into the stencil printer from the movable cart and secured for use. The dirty stencil and/or item is transported to a cleaning station where the stencil and/or item is cleaned and ready for reuse. Once cleaned, the stencil and/or item may be transported back to the stencil printer or a stockroom, where the stencil and/or item can be reused during the same or different production run.

Figure 4A:
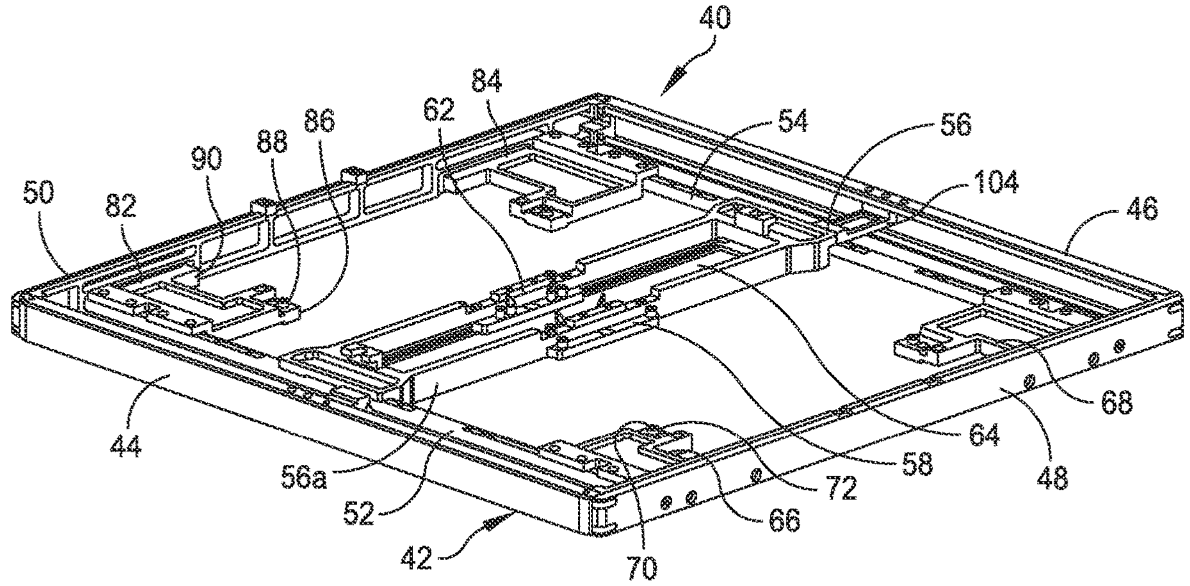
FIG. 4A is a perspective view of a dual function tooling tray of an embodiment of the present disclosure.
Figure 4B:
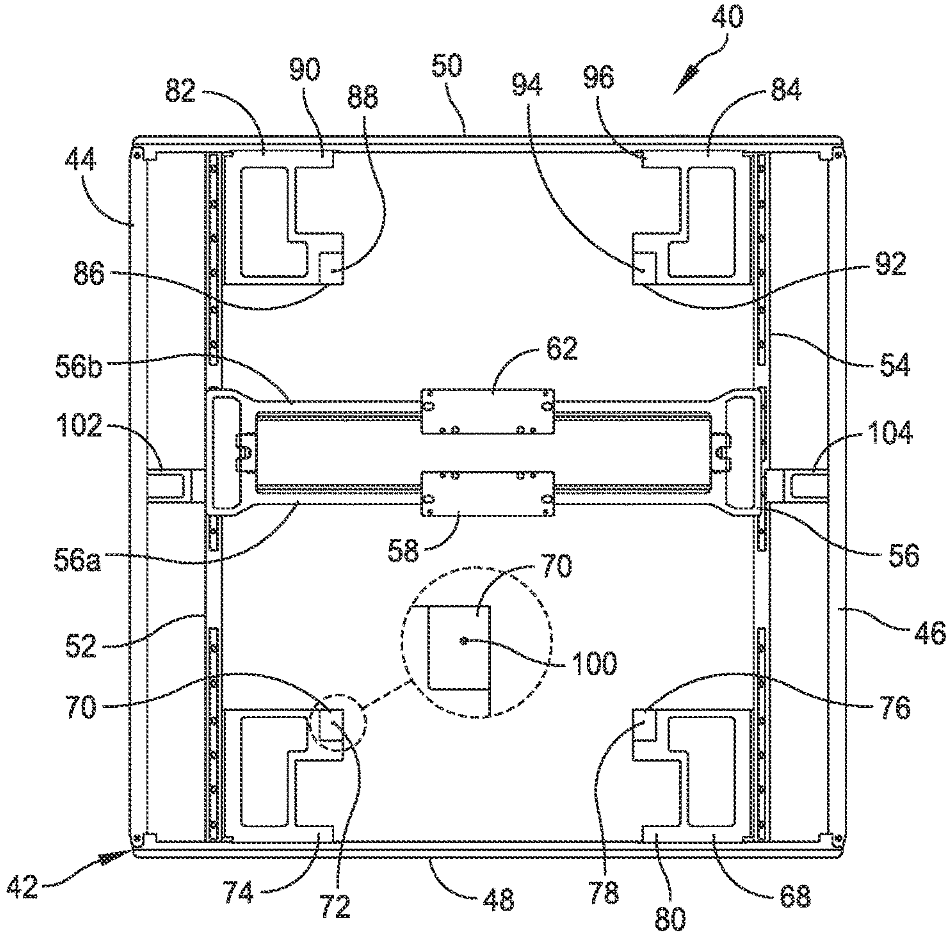
FIG. 4B is a top plan view of the tooling tray shown in FIG. 4A including a detail of a portion of the tooling tray showing a fiducial.

To accommodate the transfer of new and used squeegee blade assemblies and tooling within the stencil printer, a specially designed tooling tray may be provided. Referring to FIGS. 4A and 4B, in one embodiment, a tooling tray is generally indicated at 40. As shown, the tooling tray 40 includes a square-shaped perimeter frame generally indicated at 42 having four sides, a first side 44, a second side 46 that is parallel to the first side, a third side 48 connected to ends of the first side and the second side, and a fourth side 50 connected to opposite ends of the first side and the second side. In one embodiment, the tooling tray 40 is sized and shaped the same as the stencil 18 of the stencil printer 10. The tooling tray 40 further includes a first frame member 52 spaced from the first side 44 of the perimeter frame 42 and extending between the third side 48 and the fourth side 50 of the perimeter frame and a second frame member 54 spaced from the second side 46 of the perimeter frame and extending between the third side 48 and the fourth side 50 of the perimeter frame. As shown, the first side 44 of the perimeter frame 42, the first frame member 52, the second frame member 54, and the second side 46 of the perimeter frame are parallel with one another.

The tooling tray 40 further includes a third frame member 56 that extends between and is secured to the first frame member 52 and the second frame member 54. In one embodiment, the third frame member 56 includes two spaced apart rails 56*a*, 56*b*, each rail being configured to support a squeegee blade assembly. Specifically, a first rail 56*a* of the third frame member 56 includes a squeegee blade assembly support structure 58 that is configured to support a squeegee blade assembly, preferably a new squeegee blade assembly. A second rail 56*b* of the third frame member 56, which is spaced from the first rail 56*a*, includes a squeegee blade assembly support structure 62 that is configured to support a squeegee blade assembly, preferably a used squeegee blade assembly.

As shown, the third frame member 56 is perpendicular to the first frame member 52 and the second frame member 54. Further, the third frame member 56 includes a drip tray 64 to collect solder paste that may drip from a used squeegee blade assembly. As shown, the drip tray 64 extends between the first rail 56*a* and the second rail 56*b* of the third frame member 56. It is known that used squeegee blades may include excess solder paste disposed on the squeegee blade assembly and if the excess solder paste drips from the squeegee blade assembly it may drip on the working or operating components of the stencil printer 10 or on printed circuit boards, e.g., circuit board 29, supported by the stencil printer. This is undesirable. In one embodiment, the drip tray 64 is secured to a bottom surface of the third frame member 56 beneath the squeegee blade assembly support structures 58, 62.

The tooling tray 40 further includes a first support 66 secured to the first frame member 52 and a second support 68 secured to the second frame member 54 adjacent a third side 48 of the perimeter frame 42. Together, the first support 66 and the second support 68 together are configured to support tooling. Specifically, the first support 66 and the second support 68 both extend inwardly with respect to their respective frame member 52, 54. In the shown embodiment, the first support 66 and the second support 68 are positioned adjacent the third side 48 of the perimeter frame 42. Depending on the size of the tooling, the first support 66 and the second support 68 are spaced apart from one another a predetermined distance sufficient to support the tooling. In the shown embodiment, the first support 66 and the second support 68 are configured to support new tooling.

The first support 66 includes a support tab 70, which extends in a direction toward the second support 68. The support tab 70 includes a feature that extends upwardly (along a z-axis) from the support tab. The feature is configured to engage a mating feature provided on one side of the tooling to support the tooling, e.g., new tooling. In one embodiment, the feature embodies a pin 72 and the mating feature embodies an opening formed in a bottom surface of a support tab provided on one side of the tooling. Construction of the tooling will be shown and described in greater detail with reference to FIGS. 11A and 11B. The first support 66 further includes a smaller support tab 74, which is spaced from the support tab 70 and extends in a direction toward the second support 68.

Similarly, the second support 68 includes a support tab 76, which extends to the first support 66. The support tab 76 includes a feature that extends upwardly (along a z-axis) from the support tab. The feature is configured to engage a mating feature provided on an opposite side of the tooling to support the tooling. In one embodiment, the feature embodies a pin 78 and the mating feature embodies an opening formed in a bottom surface of a support tab provided on the opposite side of the tooling. The second support 68 further includes a smaller support tab 80, which is spaced from the support tab 76 and extends in a direction toward the first support 66. The arrangement is such that the support tabs 70, 76 and the smaller support tabs 74, 80 of the first support 66 and the second support 68, respectively, hold the tooling in a precise position for transition from the tooling tray 40 to the stencil printer 10.

The tooling tray 40 further includes a third support 82 secured to the first frame member 52 and a fourth support 84 secured to the second frame member 54 adjacent a fourth side 50 of the perimeter frame 42. Together, the third support 82 and the fourth support 84 together are configured to support tooling. Specifically, the third support 82 and the fourth support 84 both extend inwardly with respect to their respective frame member 52, 54. In the shown embodiment, the third support 82 and the fourth support 84 are positioned adjacent the fourth side 50 of the perimeter frame 42. Depending on the size of the tooling, the third support 82 and the fourth support 84 are spaced apart from one another a predetermined distance sufficient to support the tooling. In the shown embodiment, the third support 82 and the fourth support 84 are configured to support used tooling.

The third support 82 and the fourth support 84 are constructed in a manner similar to the construction of the first support 66 and the second support 68, respectively. The third support 82 includes a support tab 86, which extends in a direction toward the fourth support 84. The support tab 86 includes a feature that extends upwardly (along a z-axis) from the support tab. The feature is configured to engage a mating feature provided on one side of the tooling to support the tooling, e.g., used tooling. In one embodiment, the feature embodies a pin 88 and the mating feature embodies an opening formed in a bottom surface of a support tab provided on one side of the tooling. The third support 82 further includes a smaller support tab 90, which is spaced from the support tab 86 and extends in a direction toward the fourth support 84. Similarly, the fourth support 84 includes a support tab 92, which extends to the third support 82. The support tab 92 includes a feature that extends upwardly (along a z-axis) from the support tab. The feature is configured to engage a mating feature provided on an opposite side of the tooling to support the tooling. In one embodiment, the feature embodies a pin 94 and the mating feature embodies an opening formed in a bottom surface of a support tab provided on the opposite side of the tooling. The fourth support 84 further includes a smaller support tab 96, which is spaced from the support tab 92 and extends in a direction toward the third support 82. The arrangement is such that the support tabs 86, 92 and the smaller support tabs 90, 96 of the third support 82 and the fourth support 84, respectively, hold the tooling in a precise position for transition from the stencil printer 10 to the tooling tray 40.

Referring particularly to FIG. 4B, in some embodiments, the first support 66 of the tooling tray 40 includes a fiducial 100 that is provided to be detected by a vision system, such as imaging system 30 of stencil printer 10. The fiducial 100 may be provided on a bottom surface of the support tab 70 of the first support 66, directly under the feature, i.e., the pin 72. Similarly, the second support 68 may include an optional fiducial that is provided to be detected by the imaging system. The fiducial may be provided on the bottom surface of the support tab 76 of the second support 68, directly under the feature, i.e., the pin 78. The provision of two fiducials enables a more accurate positioning of the new tooling prior on the first support 66 and the second support 68 to being removed from the tooling tray.

Similarly, in some embodiments, the third support 82 includes a fiducial, similar to fiducial 100, that is provided to be detected by the imaging system. The fiducial may be provided on the bottom surface of the support tab 86 of the third support 82, directly under the feature, i.e., the pin 88. Similarly, the fourth support 84 may include an optional fiducial that is provided to be detected by the imaging system. The fiducial may be provided on the bottom surface of the support tab 92 of the fourth support 84, directly under the feature, i.e., the pin 94. As with the first support 66 and the second support 68, the provision of two fiducials enables a more accurate positioning of the used tooling on the third support 82 and the fourth support 84 when positioned on the tooling tray.

To help stabilize the tooling tray 40, the tooling tray further includes a first support member 102 connected at one end thereof to the first side 44 of the perimeter frame 42 and at an opposite end to the first frame member 52 and a second support member 104 connected at one end thereof to the second side 46 of the perimeter frame 42 and at an opposite end to the second frame member 54. As shown, each of the first support member 102 and the second support member 104 are positioned midway on their respective frame member 52, 54. The support members 102, 104 assist in stabilizing the first frame member 52 and the second frame member 54 with respect to the perimeter frame 42.

Figure 5A:
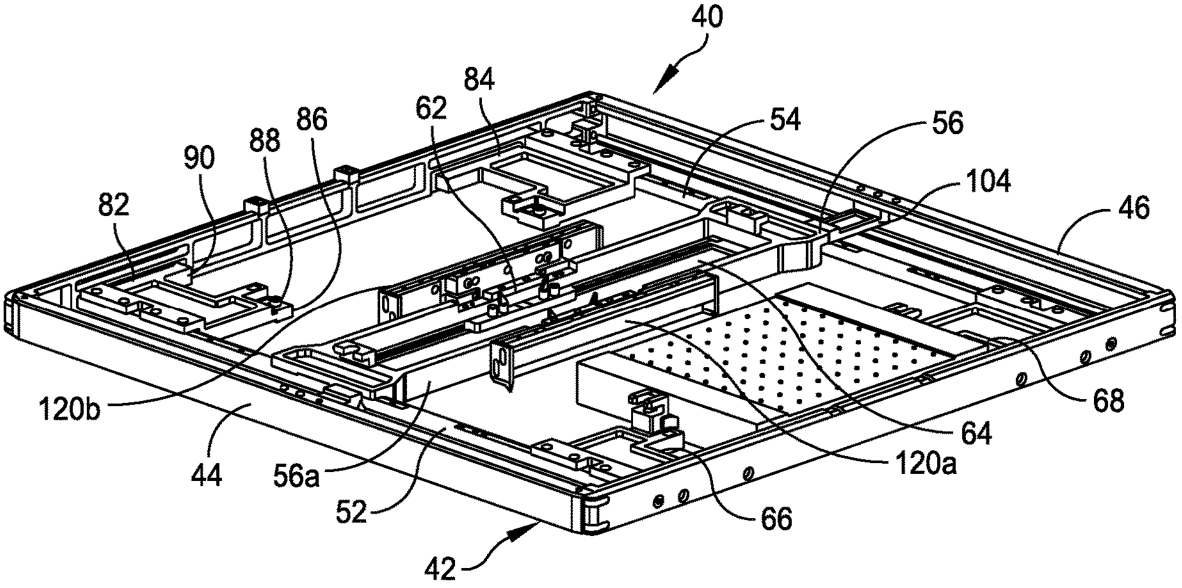
FIG. 5A is a perspective view of the tooling tray showing a first (new) tooling and a first (new) squeegee blade assembly supported by the tooling tray.
Figure 5B:
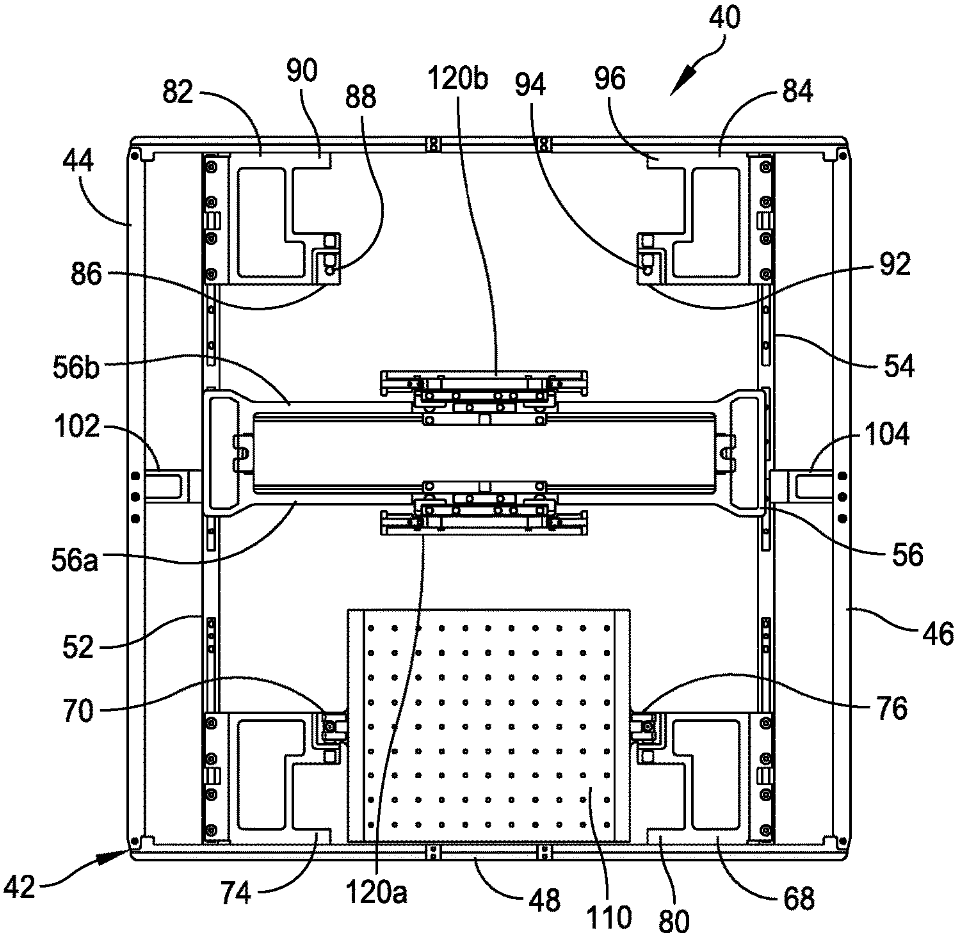
FIG. 5B is a top plan view of the tooling tray shown in FIG. 5A.

Referring to FIGS. 5A and 5B, the tooling tray 40 is shown supporting new tooling 110 and a new squeegee blade assembly, including a front squeegee blade subassembly 120*a* and a rear squeegee blade subassembly 120*b*. Together the front squeegee blade subassembly 120*a* and the rear squeegee blade subassembly 120*b* may be referred to as the squeegee blade subassembly 120. As shown, the new tooling 110 is supported by the first support 66 and the second support 68 and the front squeegee blade subassembly 120*a* is supported by the squeegee blade assembly support structure 58 of the first rail 56*a* of the third frame member 56 and the rear squeegee blade subassembly 120*b* is supported by the squeegee blade assembly support structure 62 of the second rail 56*b* of the third frame member. In one embodiment, when manually presenting the tooling tray 40 to the stencil printer, the tooling tray is pushed into the stencil printer to a position that is a predetermined distance, e.g., 70 millimeters (mm) from being fully inserted. In another embodiment, the tooling tray 40 is pushed into a known position and then moved to the 70 mm location with a gripper mechanism associated with the stencil printer and shown with reference to FIGS. 8A, 8B, 12A, 12B, 13A and 13B. In another embodiment, when presenting the tooling tray 40 to the stencil printer with an automated delivery device, e.g., a movable cart, the tooling tray is pulled into the stencil printer from a sleeve of the automated delivery device to a position that is 70 mm from fully inserted.

Figure 6A:
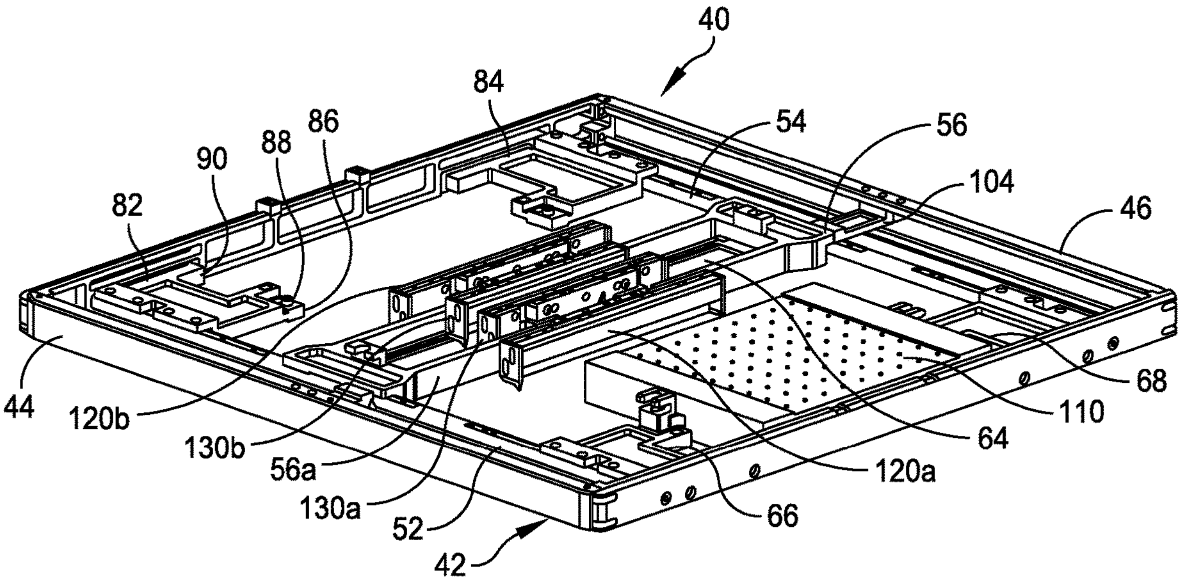
FIG. 6A is a perspective view of the tooling tray showing the first (new) tooling, the first (new) squeegee blade assembly, and a second (used) squeegee blade assembly supported by the tooling tray.
Figure 6B:
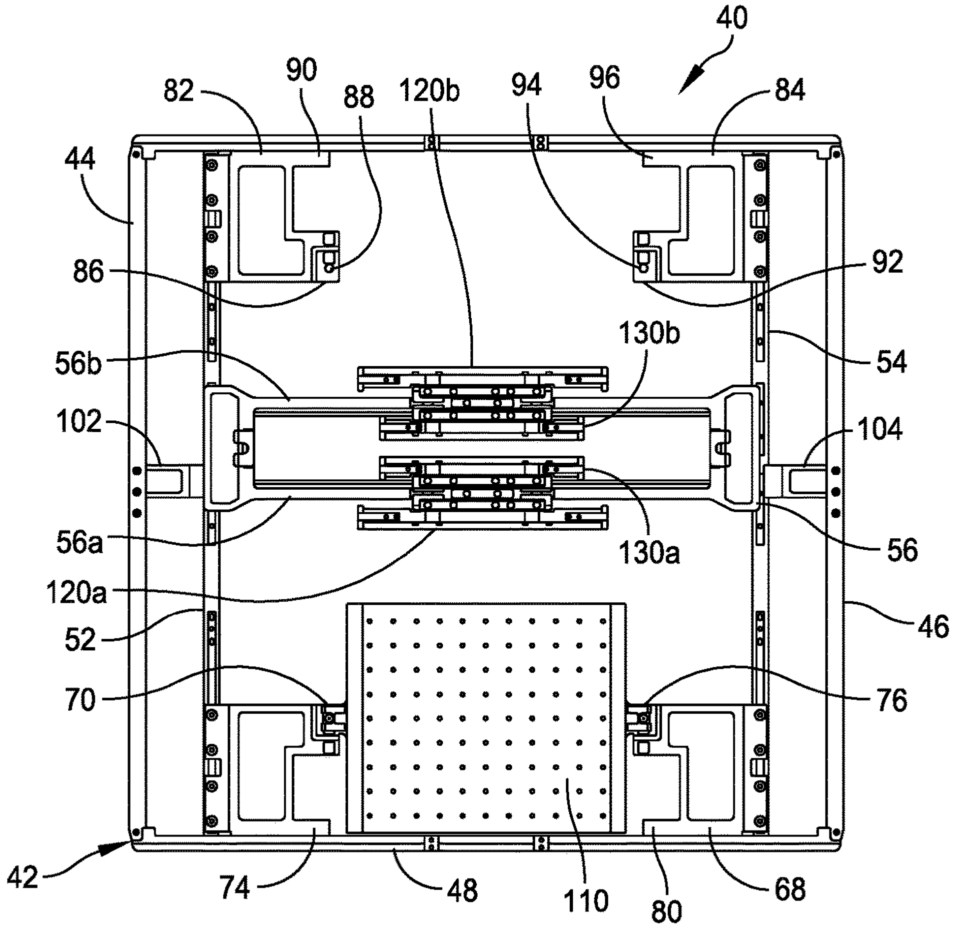
FIG. 6B is a top plan view of the tooling tray shown in FIG. 6A.

Referring to FIGS. 6A and 6B, the tooling tray 40 is shown supporting, in addition to the new tooling 110 and the new squeegee blade assembly 120 shown in FIGS. 5A and 5B, a used squeegee blade assembly, including a front squeegee blade subassembly 130*a* and a rear squeegee blade subassembly 130*b*, which are supported by the squeegee blade assembly support structures 58, 62 of the first rail 56*a* and the second rail 56*b* of the third frame member 56, respectively. Together the front squeegee blade subassembly 130*a* and the rear squeegee blade subassembly 130*b* may be referred to as the squeegee blade subassembly 130. As shown, the drip tray 64 prevents unwanted solder paste from dripping into the interior compartment of the stencil printer. In one embodiment, the gripper mechanism may be used to position and align the tooling tray 40 prior to receiving the used squeegee blade assembly 130.

Figure 7A:
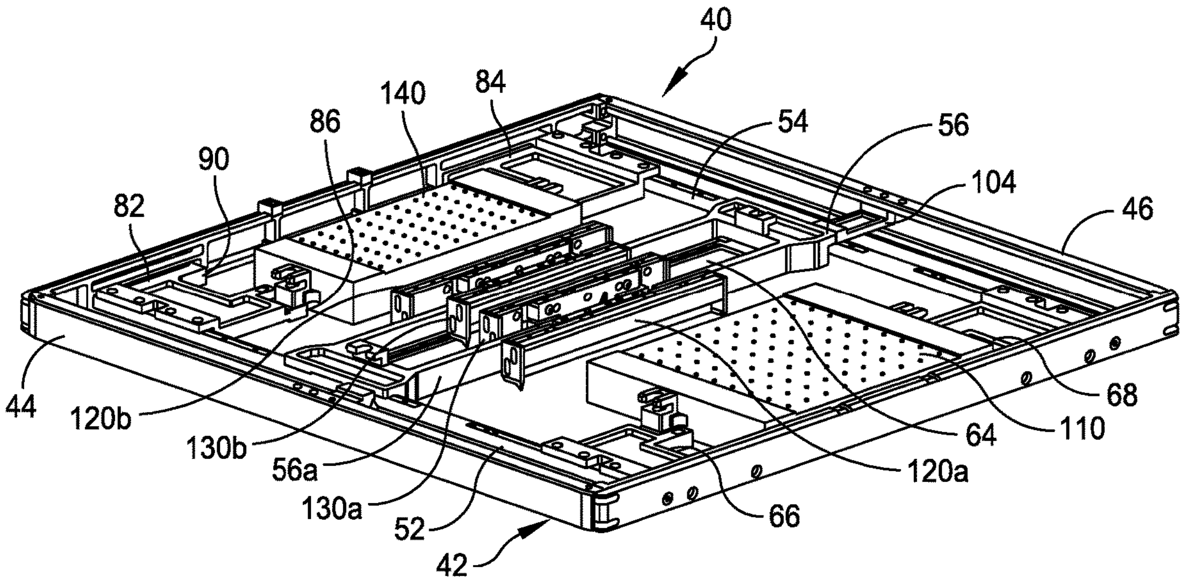
FIG. 7A is a perspective view of the tooling tray showing the first (new) tooling, the first (new) squeegee blade assembly, a second (used) squeegee blade assembly, and second (used) tooling supported by the tooling tray.
Figure 7B:
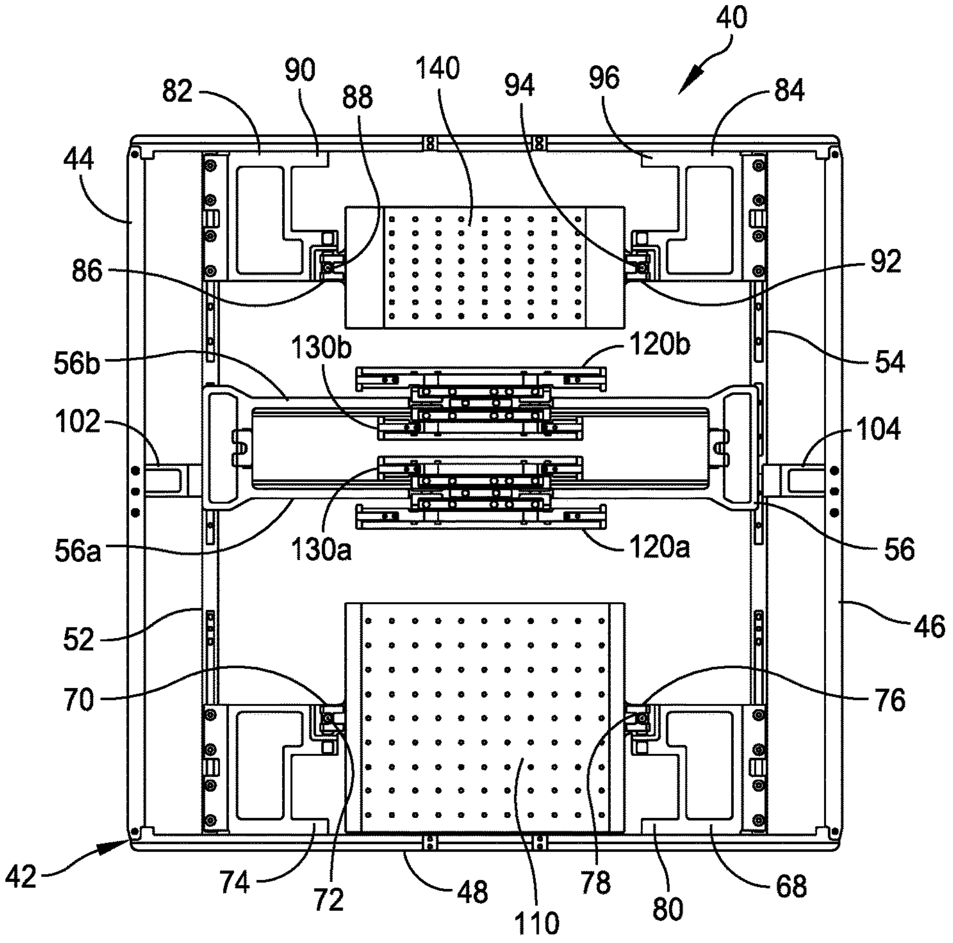
FIG. 7B is a top plan view of the tooling tray shown in FIG. 7A.
Figure 8A:
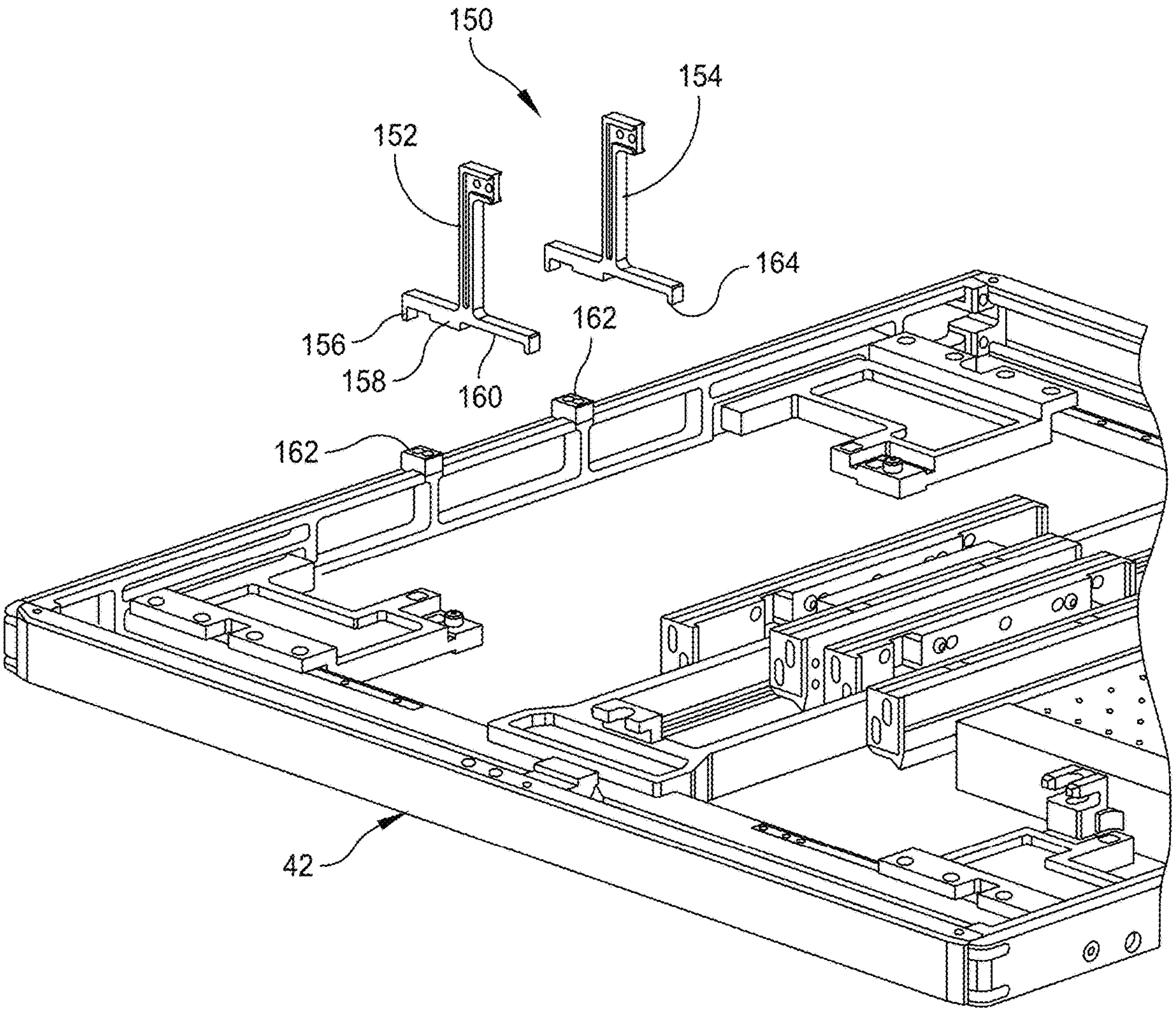
FIG. 8A is a perspective view of a portion of the tooling tray and a gripper shown in a spaced relation with respect to the tooling tray.
Figure 8B:
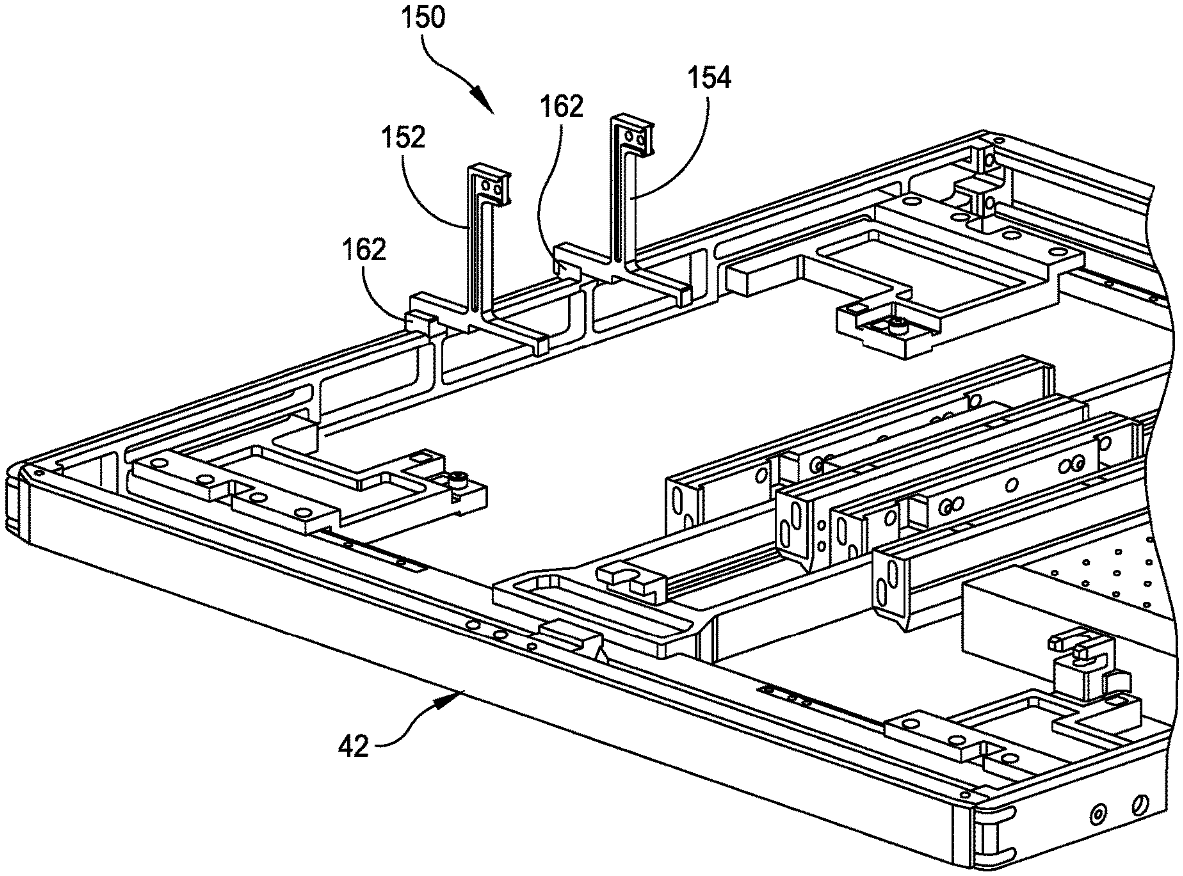
FIG. 8B is a perspective view of the portion of the tooling tray shown in FIG. 8A and the gripper shown engaging the tooling tray.

Referring to FIGS. 7A and 7B, the tooling tray 40 is shown supporting, in addition to the new tooling 110, the new squeegee blade assembly 120, and the used squeegee blade assembly 130 shown in FIGS. 6A and 6B, used tooling 140, which is supported by the third support 82 and the fourth support 84. The tooling tray 40 is fully loaded with new and used tooling 110, 140 and new and used squeegee blade assemblies 120, 130.

Referring to FIGS. 8A, 8B and FIGS. 12A, 12B, 13A and 13B, in one embodiment, a gripper mechanism, generally indicated at 150, includes a pair of spaced apart gripper arms 152, 154 that are designed to engage and move the tooling tray 40 (and a stencil). As shown, each gripper arm 152, 154 includes a downwardly extending toe portion 156 and a downwardly extending intermediate portion 158, which together define a recess 160 that is sized to receive a detent portion 162 of the tooling tray 40 in the manner illustrated in FIGS. 8A and 8B. Specifically, the gripper arm 152 of the gripper mechanism 150 spaced from the tooling tray 40 with the recess 160 positioned above the detent portion 162 of the tooling tray. The gripper arm 152 of the gripper mechanism 152 engages the perimeter frame 42 of the tooling tray 40 with the detent portion 162 of the tooling tray received within the recess 160 of the gripper arm. Each gripper arm 152, 154 further includes a downwardly extending heel portion 164 that is used to slide or move the tooling tray 40 (or a stencil) by engaging the perimeter frame 42.

Figure 9A:
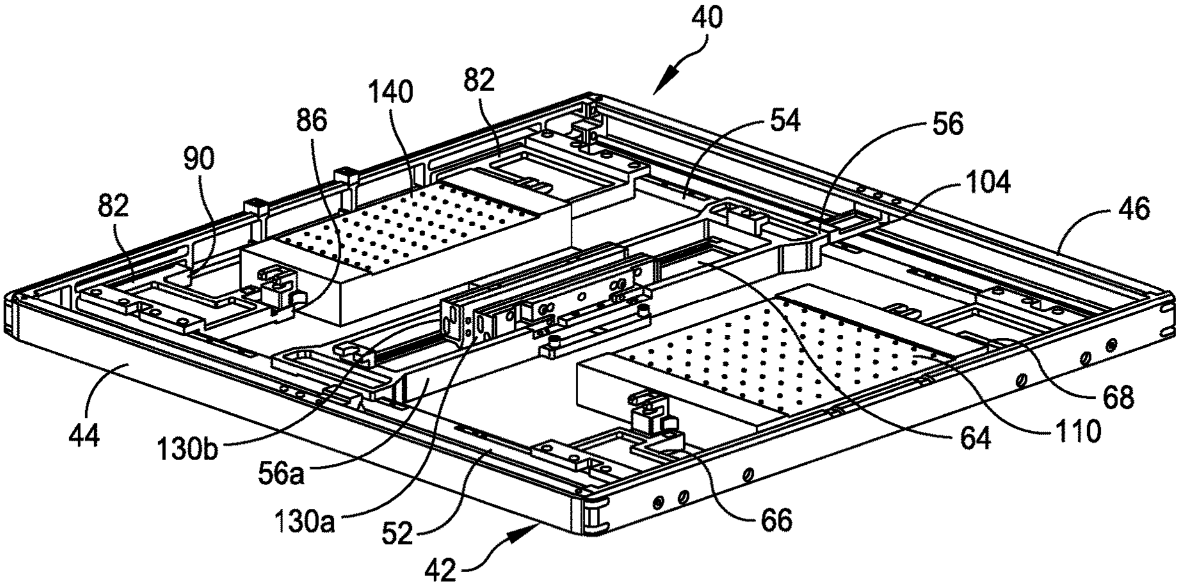
FIG. 9A is a perspective view of the tooling tray showing the first (new) tooling, the second (used) squeegee blade assembly, and the second (used) tooling supported by the tooling tray.
Figure 9B:
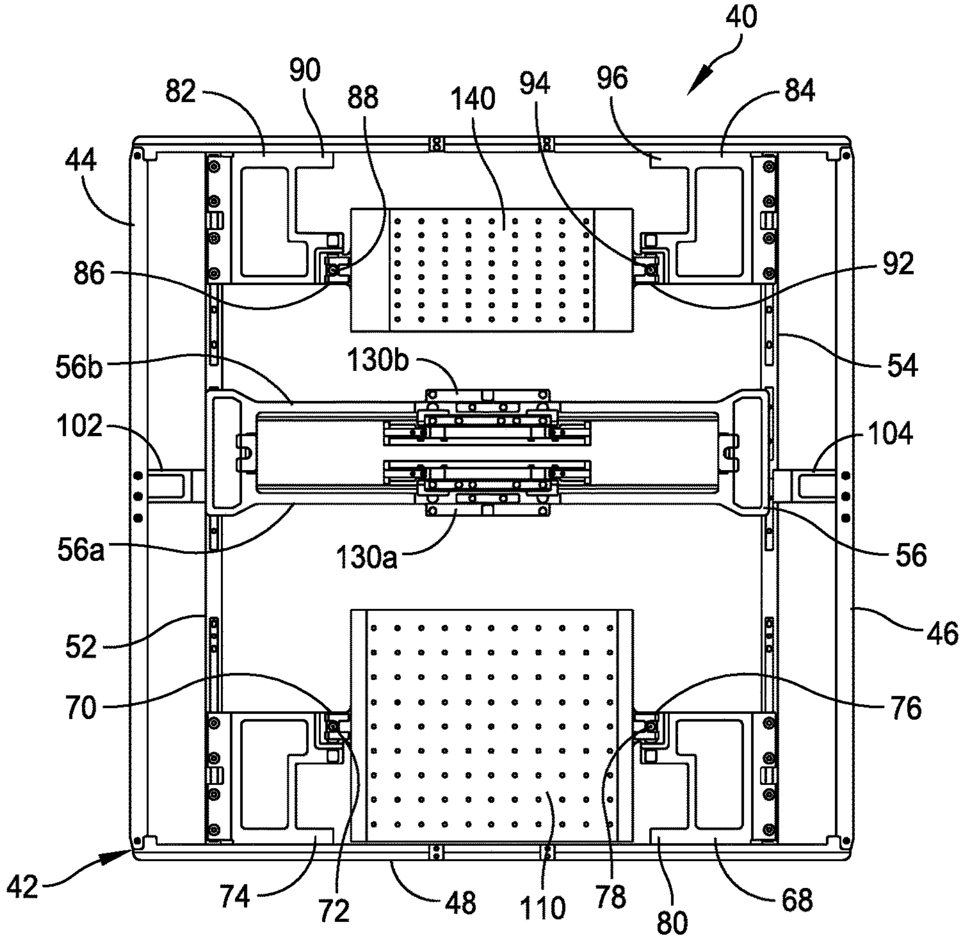
FIG. 9B is a top plan view of the tooling tray shown in FIG. 9A.

Referring to FIGS. 9A and 9B, the tooling tray 40 as shown in FIGS. 7A and 7B is now shown with the new squeegee blade assembly 120 removed from the tooling tray and installed on the print head assembly of the stencil printer. The tooling tray 40 is positioned and aligned for removing the new squeegee blade assembly 120 and positioning the assembly within the stencil printer. With the new squeegee blade assembly 120 removed, there is space for removing and placing the new tooling 110 within the stencil printer.

Figure 9C:
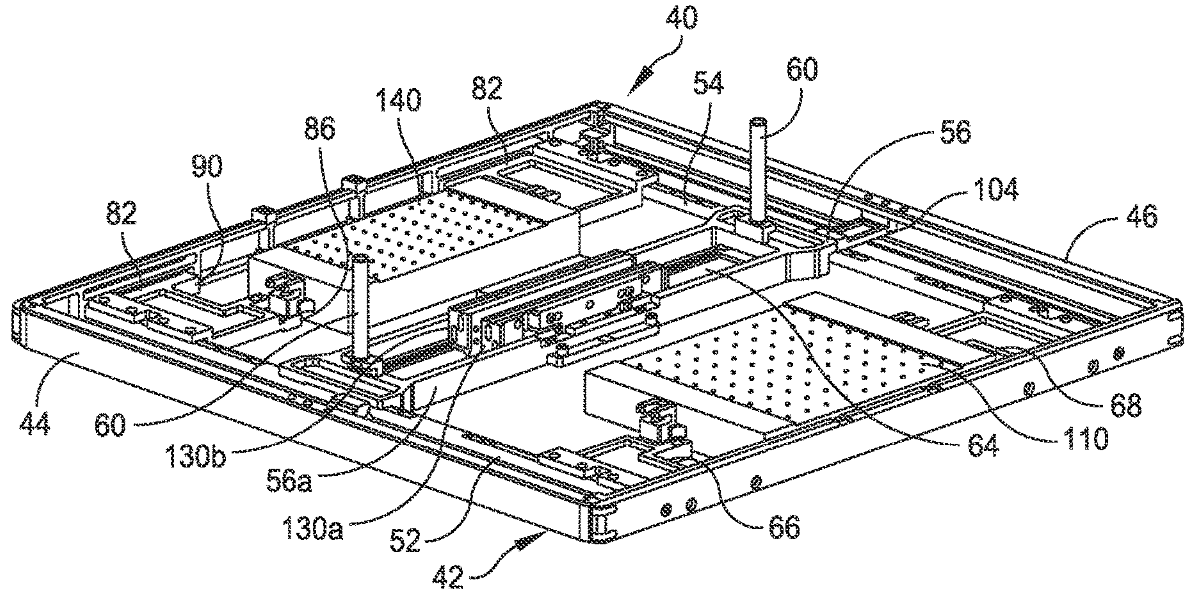
FIG. 9C is a perspective view of the tooling tray shown in FIGS. 9A and 9B showing the first (new) tooling, the second (used) squeegee blade assembly, the second (used) tooling supported by the tooling tray, and a frame member of the tooling tray being manipulated by the gripper.
Figure 9D:
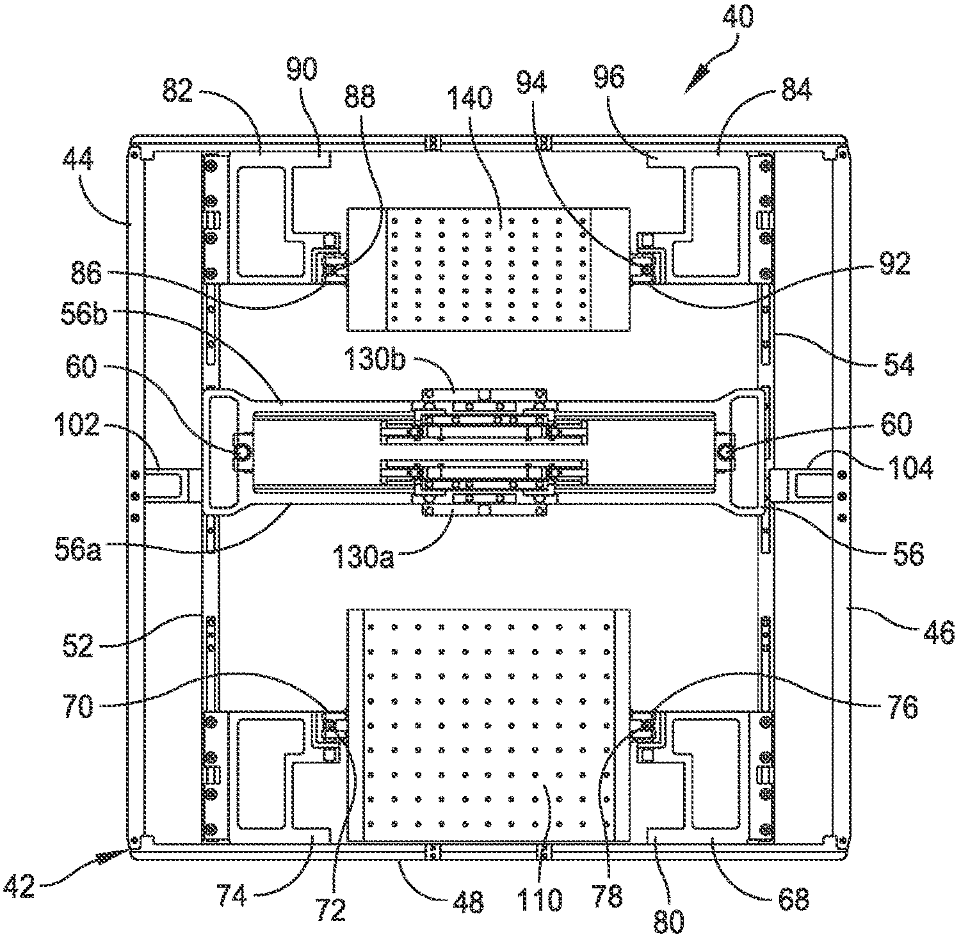
FIG. 9D is a top plan view of the tooling tray shown in FIG. 9C.

Referring additionally to FIGS. 9C and 9D, when additional capacity on the tooling tray 40 is desired, the frame member 56 is repositioned within the tooling tray by the tooling pins, each indicated at 60, associated with the print head and the print head gantry. This additional space creates room to remove and place the new tooling 110 within the stencil printer.

Figure 10A:
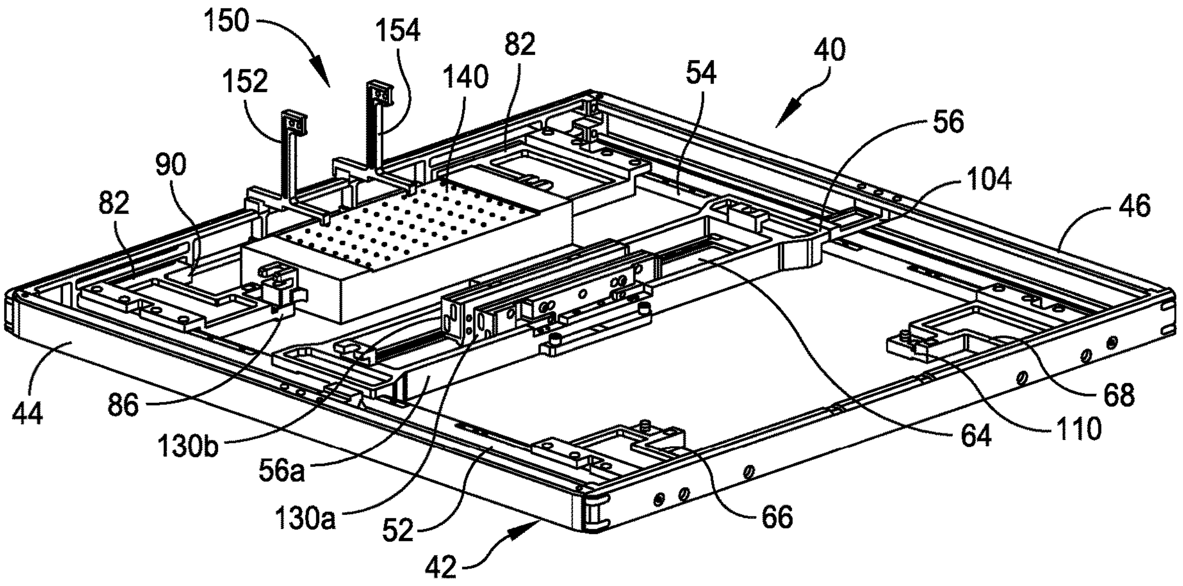
FIG. 10A is a perspective view of the tooling tray showing the second (used) squeegee blade assembly and the second (used) tooling supported by the tooling tray.
Figure 10B:
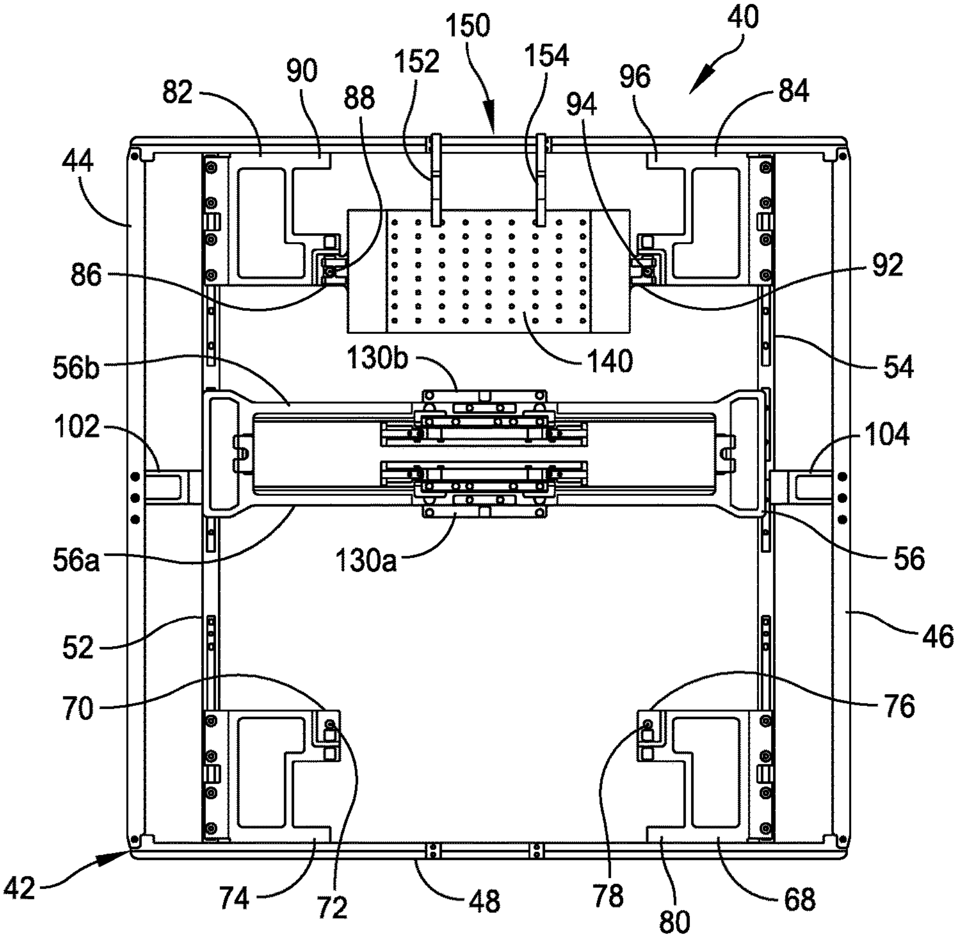
FIG. 10B is a top plan view of the tooling tray shown in FIG. 10A.

Referring to FIGS. 10A and 10B, the tooling tray 40 as shown in FIGS. 9A and 9B is now shown with the new tooling 110 removed from the tooling tray and installed on the substrate support of the stencil printer. The tooling tray 40 is ready to be completely removed from the stencil printer. The gripper mechanism 150 is employed to move the tooling tray 40 to a desired position in which the tooling tray may be manually removed from the stencil printer or by the automatic delivery device.

Figure 11A:
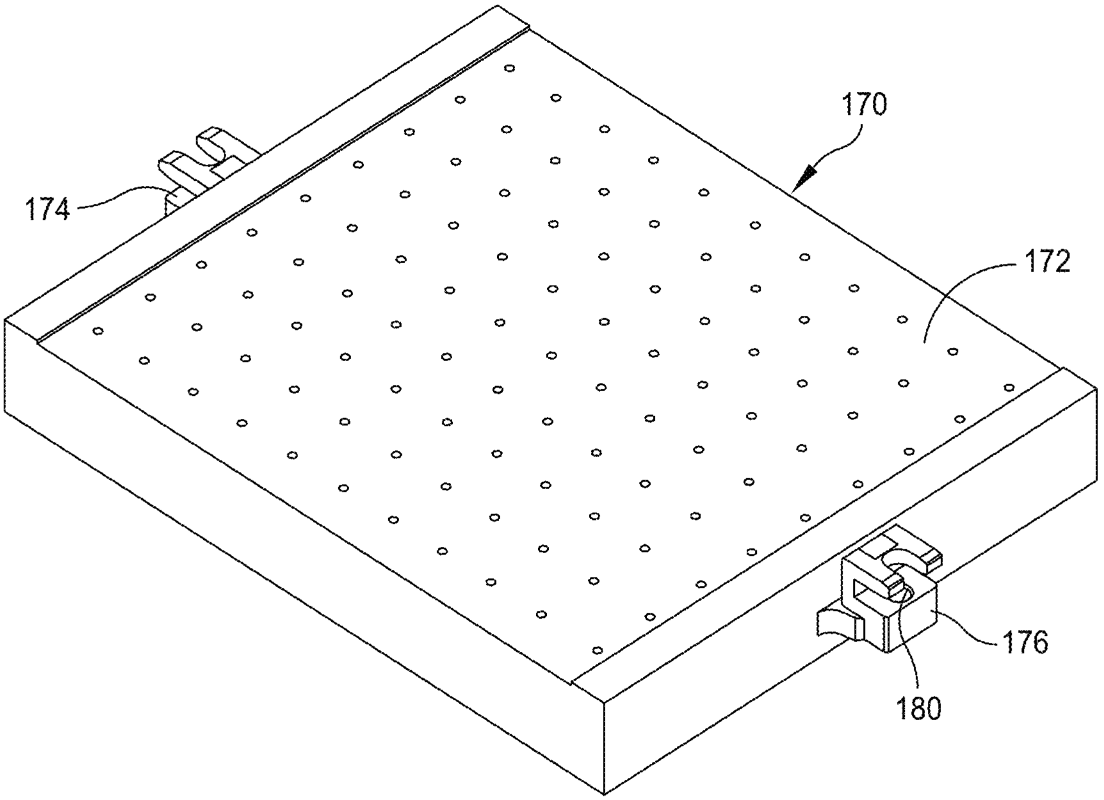
FIG. 11A is a perspective view of a modified tooling.
Figure 11B:
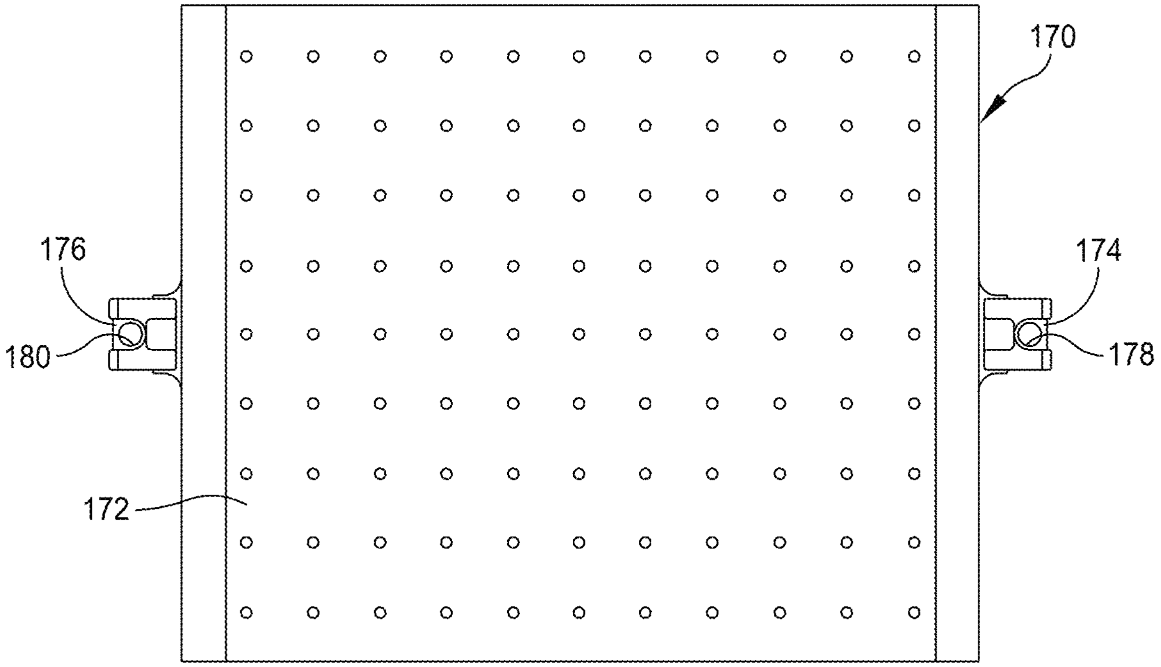
FIG. 11B is a top plan view of the modified tooling shown in FIG. 11A.
Figure 12A:
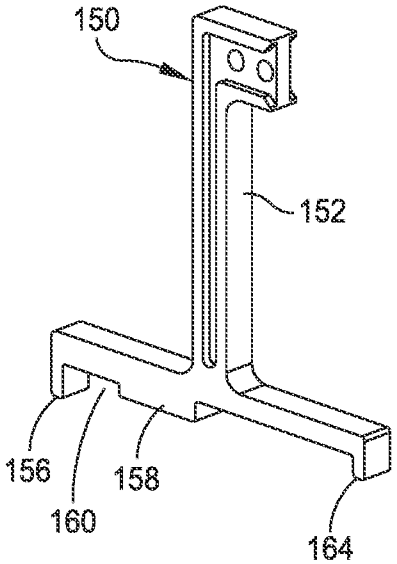
FIG. 12A is an enlarged perspective view of a gripper of an embodiment of the present disclosure.
Figure 12B:
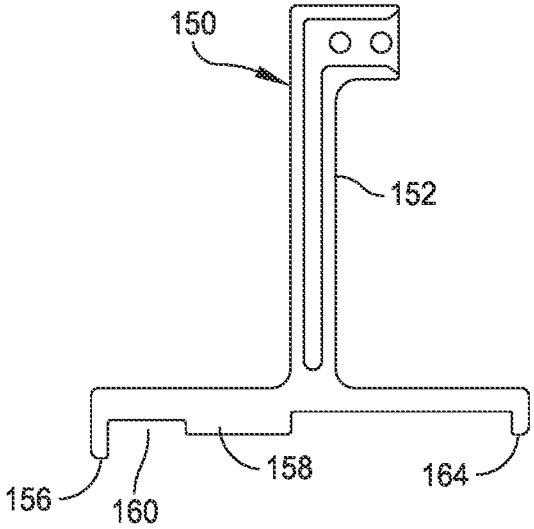
FIG. 12B is an enlarged side elevation view of the gripper shown in FIG. 12A.
Figure 13A:
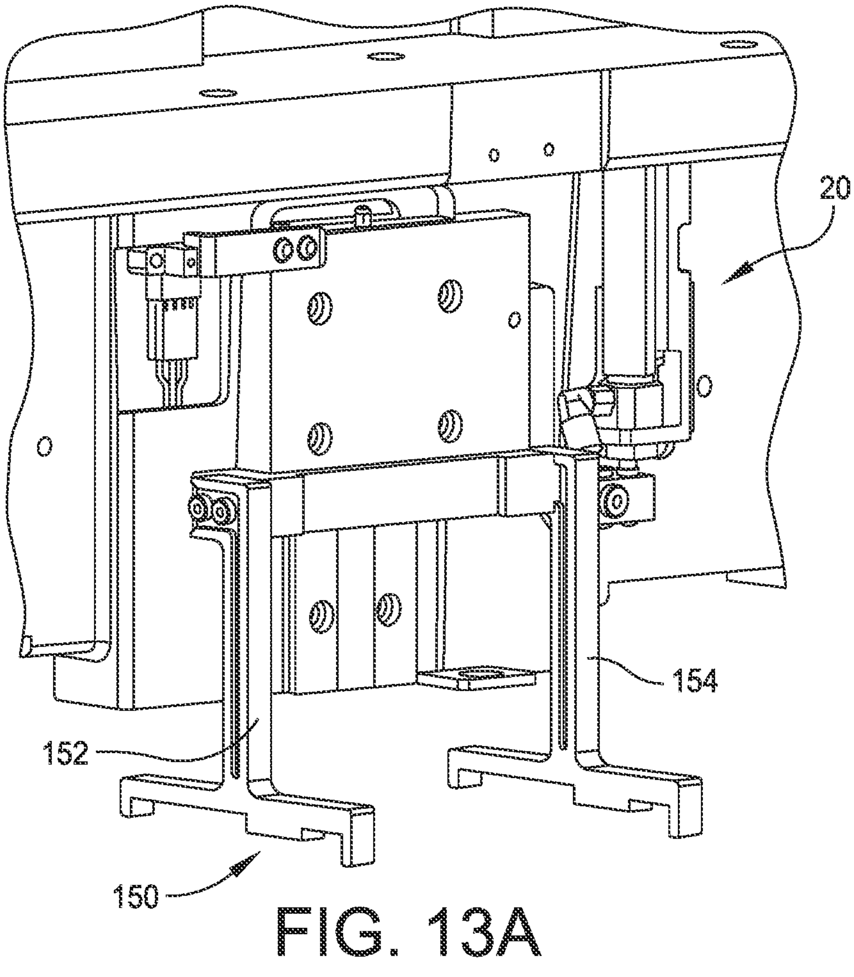
FIG. 13A is an enlarged perspective view of a portion of a print head assembly of the stencil printer showing the grippers.
Figure 13B:
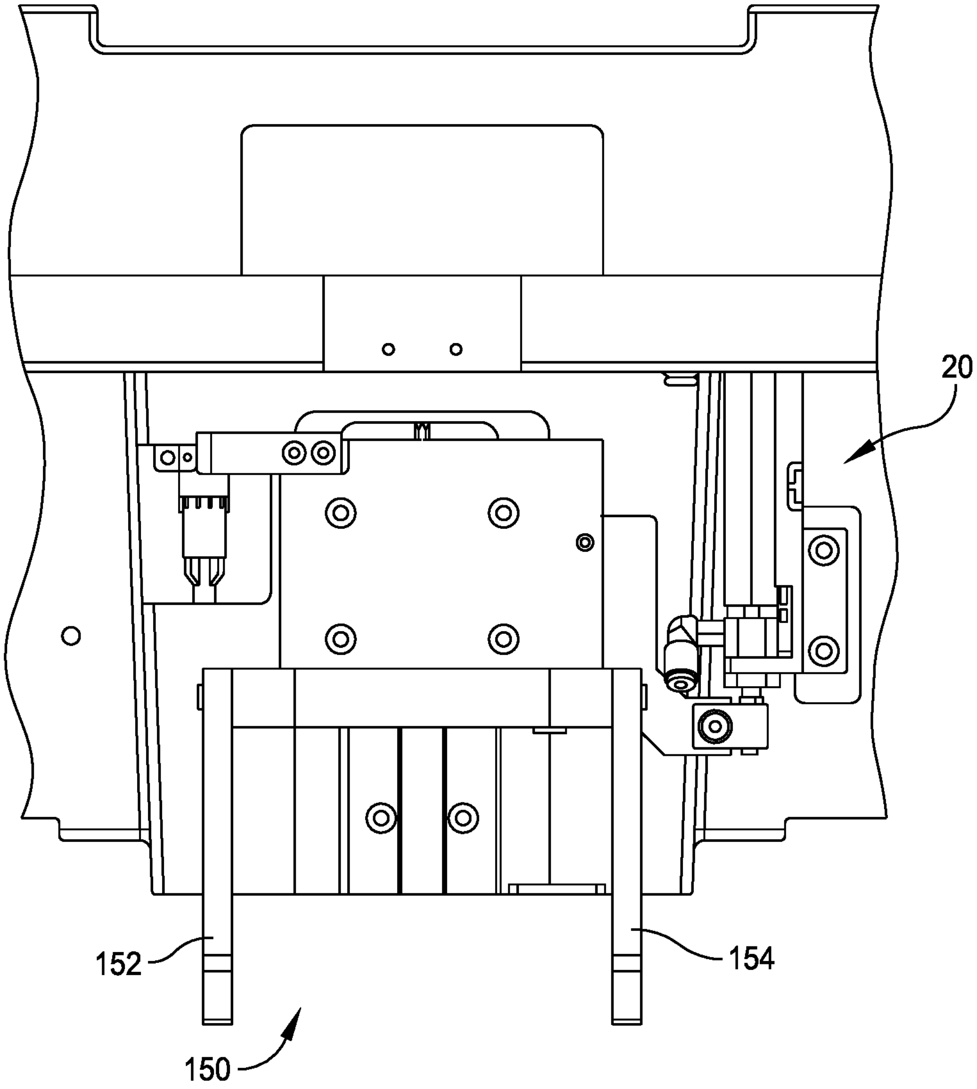
FIG. 13B is a rear elevational view of the portion of a print head assembly shown in FIG. 13A.

Referring to FIGS. 11A and 11B, an exemplary tooling is generally designated at 170. As shown, the tooling 170 includes a rectangular tooling plate 172 and two outwardly extending support tabs 174, 176 provided at opposite edges of the tooling plate. Each support tab 174 includes a respective opening 178, 180, which are described above. Each opening being sized to receive a respective pin, e.g., pins 72, 78 of the first and second supports 66, 68, respectively, from the tooling tray.

Referring to FIGS. 12A, 12B, 13A and 13B, the gripper arms 152, 154 of the gripper mechanism 150 are configured to enable new tooling 110 to be picked and placed with the squeegee blade assembly, e.g., by print head assembly 20, in tow.

An exemplary sequence of replacing items within a stencil printer is described below. To efficiently utilize the capabilities of the stencil printer for the automated exchange of the stencil, the squeegee blades, and work holder tooling, a specific sequence of removing and replacing items is preferred. The order of sequence was developed within and around the physical constraints of the stencil printer. It should be understood that the sequence of replacing items within the stencil printer disclosed herein can be adapted to suit any custom needs of the stencil printer or the movable cart.

The print head and the print head gantry are used to transfer and precisely position a tooling tray. The tooling tray is configured to hold the squeegee blade assembly and the tooling used within the stencil printer. When the print head and the print head gantry position the tooling tray within the stencil printer using printer imaging registration, the squeegee blade assembly and the tooling can be transferred from or to the tooling tray using the printer print head gantry. In one embodiment, the imaging system, e.g., imaging system 30, can be used to take an image of the tooling tray and the determine the location of the tooling tray by using the printer imaging registration software associated with the controller, e.g., controller 14.

A full stencil printer change of replaceable items requires removal of stencil and unloading the squeegee blade assembly and tooling from the stencil printer and subsequently loading a new squeegee blade assembly and tooling and inserting a new stencil into the printer. In one embodiment, a method that specifies a sequence of replacing items in the stencil printer, the order of sequence for the automated printer change of tooling is as follows. The existing stencil is removed from the stencil printer.

A tooling tray is inserted into the stencil printer using the print head and the print head gantry. The tooling tray includes the new tooling and the new squeegee blade assembly. The tooling tray may be presented to the stencil printer by the operator or by the movable cart. The position of the tooling tray is verified by using the imaging registration verification software associated with the controller. As mentioned above, the imaging system can be employed to take an image of the tooling tray and send the image to the controller for verification. Further, the imaging system can be used to position the tooling tray so that the tooling tray is precisely aligned to devices on the print head, e.g., the tooling pins associated with the print head.

After determining the location of the tooling tray, the squeegee blade assembly is removed from the print head of the stencil printer and placed into the tooling tray. Next, the tooling is removed from the stencil printer. Specifically, the tooling is picked up and placed into the tooling tray by using tooling pins associated with the print head and the print head gantry. Once the squeegee blade assembly and the tooling are placed in the tooling tray, the process of loading the new squeegee blade assembly and the new tooling may be initiated.

As mentioned above, the tooling tray includes a new squeegee blade assembly and new tooling that are intended to replace the used squeegee blade assembly and the used tooling that were previously removed from the stencil printer. Next, the new squeegee blade assembly is picked up and installed on the print head. Next, the new tooling is placed on the stencil printer work holder table, e.g., the support assembly 28, by using the tooling pins associated with the print head and the print head gantry of the stencil printer. After installing the new squeegee blade assembly and the new tooling, the tooling tray is removed from the stencil printer.

The new stencil is inserted into the stencil printer. The sequence of replacing items in the stencil printer is completed at this point.

The movable cart can be configured to present and remove stencils and tooling trays from the stencil printer. For example, in one embodiment, the stencil printer can be configured to move the stencil and the tooling tray to a suitable position in which the movable cart is configured to complete the removal. The stencil and/or the tooling tray can be moved and positioned within the stencil printer by the tooling pins associated with the print head and the print head gantry. Specifically, the tooling pins can be used to engage the stencil and/or the tooling tray to laterally move the stencil and/or tooling tray within the stencil printer.

As used herein, an "automated" or "fully automated" changeover describes the replacement or replenishment of an item without human intervention.

As used herein, a "partially automated" changeover describes the replacement or replenishment of an item with some or limited human intervention.

As used herein, "transport" or "transporting" describes moving an item from one position to another, either manually or with a machine.

As used herein, "install" or "installing" describes the process of placing an item in a position ready for use.

As mentioned above, the movable cart can be employed to replace other items within the stencil printer. For example, the stencil wiper assembly includes consumables, e.g., paper and solvent, which can be automatically replaced by the movable cart.

The concepts disclosed herein may be employed in other types of equipment used to fabricate electronic substrates, including dispensers, pick-and-place machines, reflow ovens, wave soldering machines, selective solder machines, and inspection stations. For example, the concepts directed to replacing paste cartridges can be employed in dispensers used to dispense viscous material. In another example, the concepts directed to replacing tooling can be employed in dispensers and in pick-and-place machines used to mount electronic components onto electronic substrates. In another example, the concepts directed to replacing items can be employed in replacing solder within wave soldering and selective soldering machines and cleaning product within cleaning stations.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A method for replacing items in a stencil printer, the method comprising:

providing a tooling tray including a new tooling support and a new squeegee blade assembly support and a used tooling support and a used squeegee blade assembly support, the tooling tray including a new tooling plate on the new tooling support and a new squeegee blade assembly on the new squeegee blade assembly support;

removing a used squeegee blade assembly from a print head of the stencil printer;

positioning the used squeegee blade assembly on the used squeegee blade assembly support of the tooling tray;

removing a used tooling plate from a support assembly of the stencil printer;

positioning the used tooling plate on the used tooling support of the tooling tray;

removing the new squeegee blade assembly from the tooling tray;

installing the new squeegee blade assembly on the print head of the stencil printer;

removing the new tooling plate from the tooling tray; and installing the new tooling plate on the support assembly of the stencil printer, wherein the tooling tray includes a perimeter frame having four sides, a first frame member spaced from a first side of the perimeter frame, a second frame member spaced from a second side of the perimeter frame, the first side and the second side of the perimeter frame being parallel with one another, a third frame member extending between and secured to the first frame member and the second frame member, the third frame member being configured to support at least one squeegee blade assembly, a first support secured to the first frame member and a second support secured to the second frame member, the first support and the second support together being configured to support a first tooling plate, and a third support secured to the first frame member and a fourth support secured to the second frame member, the third support and the fourth support together being configured to support a second tooling plate.

2. The method of claim 1, further comprising presenting the tooling tray to the stencil printer and moving the tooling tray within the stencil printer.

3. The method of claim 2, wherein moving the tooling tray is achieved by a gripper mechanism associated with the print head of the stencil printer.

4. The method of claim 2, wherein presenting the tooling tray to the stencil printer includes moving the tooling tray with a movable cart, which is employed to present and remove stencils and tooling trays from the stencil printer.

5. The method of claim 1, further comprising verifying a position of the tooling tray.

6. The method of claim 5, wherein verifying the position of the tooling tray includes capturing an image of the tooling tray with a fiducial provided on the tooling tray.

7. The method of claim 1, wherein the first support and the second support are positioned adjacent a third side of the perimeter frame and the third support and the fourth support are positioned adjacent a fourth side of the perimeter frame.

8. The method of claim 7, wherein the first support and the second support are spaced apart from one another a predetermined distance sufficient to support the first tooling plate.

9. The method of claim 8, wherein the third support and the fourth support are spaced apart from one another a predetermined distance sufficient to support the second tooling plate.

10. The method of claim 1, further comprising a first support member connected at one end thereof to the first side of the perimeter frame and at an opposite end to the first frame member.

11. The method of claim 10, further comprising a second support member connected at one end thereof to the second side of the perimeter frame and at an opposite end to the second frame member.

12. The method of claim 10, wherein the first support, the second support, the third support, and the fourth support each include a feature configured to engage a mating feature associated with its respective tooling plate to support its respective tooling plate.

13. The method of claim 12, wherein the feature is a pin and the mating feature is an opening sized to receive the pin.

14. The method of claim 12, wherein the at least one of the first support and the second support and at least one of the third support and the fourth support each include a fiducial configured to be detected by an imaging system.

15. The method of claim 10, wherein the third frame member is perpendicular to the first frame member and the second frame member.

16. The method of claim 10, wherein the third frame member includes at least one squeegee blade assembly support structure.

17. The method of claim 16, wherein the third frame member further includes a drip tray.

18. The method of claim 17, wherein the drip tray is secured to a bottom surface of the third frame member.

19. The method of claim 10, wherein the perimeter frame is configured to be engaged by a gripper associated with the print head of the stencil printer.

* * * * *